(12) United States Patent
Chang et al.

(10) Patent No.: US 8,163,421 B2
(45) Date of Patent: Apr. 24, 2012

(54) HIGH DURABILITY LITHIUM-ION CELLS

(76) Inventors: Tsun-Yu Chang, Taichung (TW);
Chun-Chieh Chang, Ithaca, NY (US);
Han Cheng Kuo, Burlington, MA (US)

( * ) Notice: Subject to any disclaimer, the term of this patent is extended or adjusted under 35 U.S.C. 154(b) by 699 days.

(21) Appl. No.: 12/381,167

(22) Filed: Mar. 9, 2009

(65) Prior Publication Data

US 2010/0227211 A1 Sep. 9, 2010

(51) Int. Cl.
*H01M 6/46* (2006.01)
*H01M 6/48* (2006.01)

(52) U.S. Cl. ........ 429/152; 429/153; 429/209; 429/210; 429/211; 429/246; 29/623.1; 29/623.5

(58) Field of Classification Search .................... 429/152
See application file for complete search history.

(56) References Cited

U.S. PATENT DOCUMENTS

| | | | |
|---|---|---|---|
| 5,582,931 A * | 12/1996 | Kawakami | 429/127 |
| 5,618,318 A * | 4/1997 | Reddy et al. | 29/623.1 |
| 5,750,282 A | 5/1998 | Chi et al. | 429/49 |
| 7,195,840 B2 | 3/2007 | Kaun | 429/94 |
| 7,541,112 B2 * | 6/2009 | Richard et al. | 429/211 |
| 2005/0132562 A1 * | 6/2005 | Saito et al. | 29/623.5 |
| 2007/0269714 A1 * | 11/2007 | Watanabe et al. | 429/120 |
| 2008/0131775 A1 | 6/2008 | Takayama et al. | 429/210 |
| 2008/0138698 A1 * | 6/2008 | Ogami et al. | 429/91 |
| 2008/0220330 A1 | 9/2008 | Hosaka et al. | 429/209 |
| 2008/0292953 A1 | 11/2008 | Hosaka et al. | 429/163 |
| 2009/0239130 A1 * | 9/2009 | Culver et al. | 429/50 |

* cited by examiner

*Primary Examiner* — Krishnan S Menon
(74) *Attorney, Agent, or Firm* — Kratz, Quintos & Hanson, LLP

(57) ABSTRACT

A rechargeable battery and a method of fabricating which includes stacking a plurality of electrode pages having an uncoated portion between portions coated with an active electrode material. The electrode pages are arranged in a stack and an overall current collector is connected at the uncoated portion in order to form an electrode booklet. The overall current collector maintains the arrangement of the electrode pages and electrically connects all of the uncoated portions of the electrode pages. A tilted stack of electrode pages is utilized when a large number of electrodes are desired to result in a battery cell having a vertical orientation.

10 Claims, 21 Drawing Sheets

(Stacked electrode assembly)

(Stacked electrode assembly)

HIGH DURABILITY LITHIUM-ION CELLS

FIELD OF THE INVENTION

The purpose is to make high durability lithium ion cells for high power applications such as electric and hybrid electric vehicles.

BACKGROUND

Conventionally, lithium ion cells are cylindrical in shape and are composed of winding structured electrodes. However, the winding technology has disadvantages that limit the size (capacity) and integrity of the cells as outlined below:
1. Electrode smoothness problem at a certain length: This problem becomes more serious when cell size is increased. If the electrode smoothness or the variation of the thickness can not be maintained at a certain level, the size of the wound electrodes will not be consistent and that leads to the failure in fitting into the battery can.
2. Electrode swelling problem: This limits the electrode design, processing method, and thus the yield.
3. Current collector positioning problem: Large wound cells with long electrodes need multiple current collector tabs for high power applications. Proper alignment of the tabs is always a problem for large cylindrical wound cells. Electrode thickness variation with a long electrode winding causes poor alignment of the tabs. Poor alignment makes welding of the current tabs to the cell top difficult and induces poor reliability of the cell.
4. Heat dissipation problem: This factor limits the final size of the cell owing to the difficulty of heat dissipation in a radial heat diffusion path. Nonetheless, owing to the requirement of a high C-rate for high power applications, the heat dissipation problem will affect the applicability of the cylindrical cells in high power applications. It may also cause serious safety problems.

Although stacking structured cells have advantages over the disadvantages outlined above, the stacking precision and labor intensive nature of the stacking process make the stacking structured batteries expensive and difficult in maintaining high yield while the size (corresponding to the number of layers) is increased.

A conventional stacking structured cell is shown in FIG. 1(a). The current collectors of the cathodes and anodes are normally positioned at the top of the electrode with a separator being disposed between the electrodes (Please refer to FIG. 1(b)). The disadvantages of the cell structure shown in FIGS. 1(a) and 1(b) are outlined as follows:
1. The electrodes are single pieces. This leads to the difficulty in each stacking process, as precision control is necessary during each stacking process.
2. The current collecting tab on each single electrode is either punched out from the uncoated portion of the metal substrate foil or a separated metal strip is welded to the electrode. Either way adds complications and cost to the assembling process.
3. Difficulty is encountered when welding the multiple electrode tabs together and attaching them to the main negative and positive posts under the battery cap within the limited headspace. This difficulty becomes more severe when the number of stacking layers is increased. If one of the electrodes is not welded properly, or if one of the electrode's current collector part (i.e. the uncoated substrate such as copper or aluminum foil) is broken, the performance and reliability of the resultant cell will be affected drastically. Owing to this reason, the consistency of the stacked cell becomes unpredictable especially when a vibration test is conducted.
4. For electrodes of a large surface area, if the current collector on each electrode is made too small, it will give poor current distribution and make the resultant cell perform poorly owing to the high resistance originating from each electrode.

In the present invention, the electrode stacking problems mentioned above can be solved with more advantages obtainable compared to the conventional stacking technologies.

SUMMARY OF THE INVENTION

The present invention is an electrode booklet for a rechargeable battery, having a plurality of electrode pages, each electrode page is a foil having a shape symmetric about a center line and having a top and bottom surface coated with an active electrode material at symmetric portions other than a central uncoated portion which extends between edges of the foil and includes the center line. At least one overall current collector is disposed along the uncoated portion of at least one of the plurality of electrode pages. The electrode pages are in a stack arrangement and similarly oriented, with the at least one overall current collector being connected to the uncoated portion of all of the plurality of electrode pages to maintain the plurality of electrode pages in the stack arrangement and to provide an electrical connection between all of the plurality of electrode pages.

The present invention includes a method of fabricating an electrode booklet for a rechargeable battery. The method includes providing a plurality of electrode pages, each being a foil having a shape symmetric about a center line and having a top and bottom surface coated with an active electrode material at two similar portions other than a central uncoated portion which extends between edges of the foil and includes the center line, arranging the plurality of electrode pages in a stack with the electrode pages being similarly oriented, providing at least one overall current collector disposed along the uncoated portion of at least one of the plurality of stacked electrode pages and connecting all the plurality of electrode pages to maintain the plurality of electrode pages in the stack arrangement and to provide an electrical connection between all of the plurality of electrode pages.

DETAILED DESCRIPTION

Figure 1A:
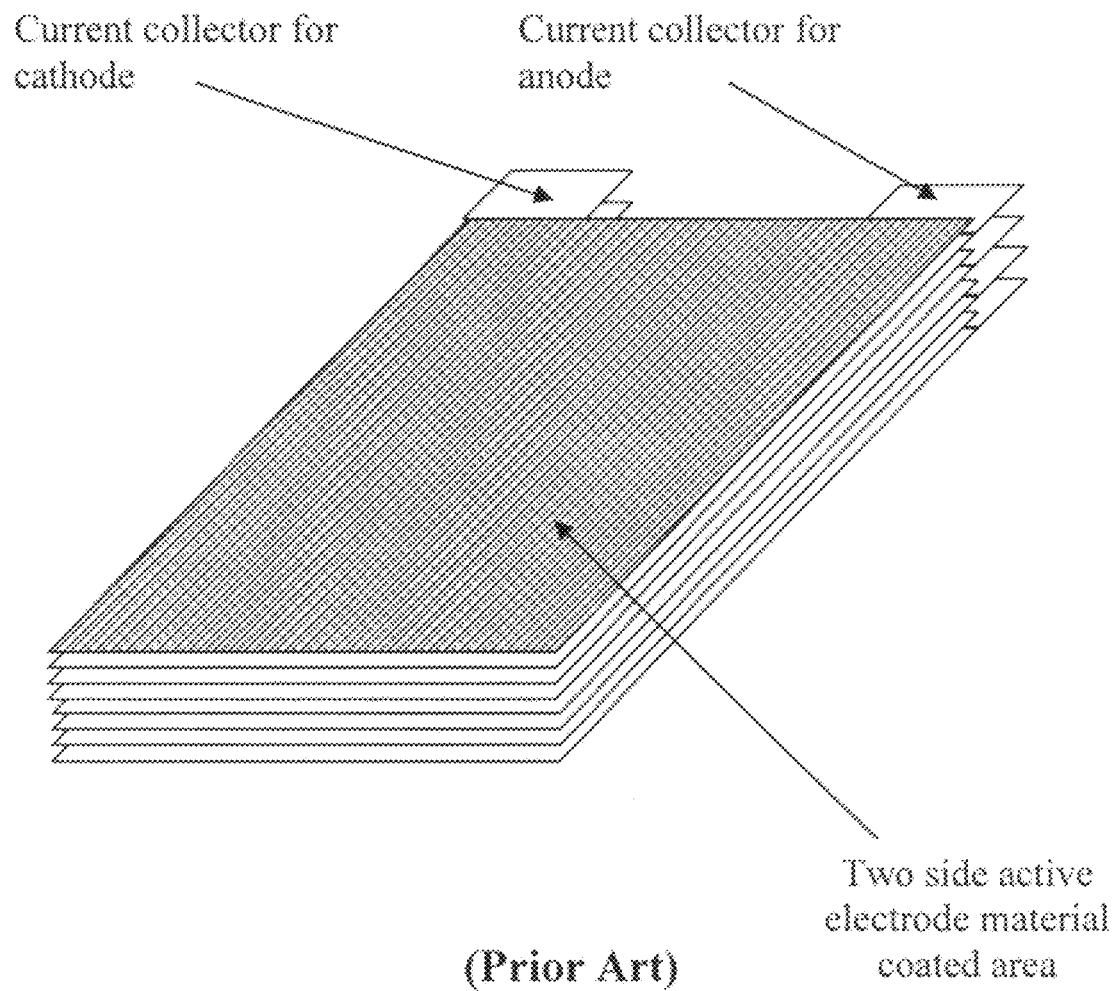
FIGS. 1(a) and 1(b) are examples of stacked electrodes of the prior art.
Figure 1B:
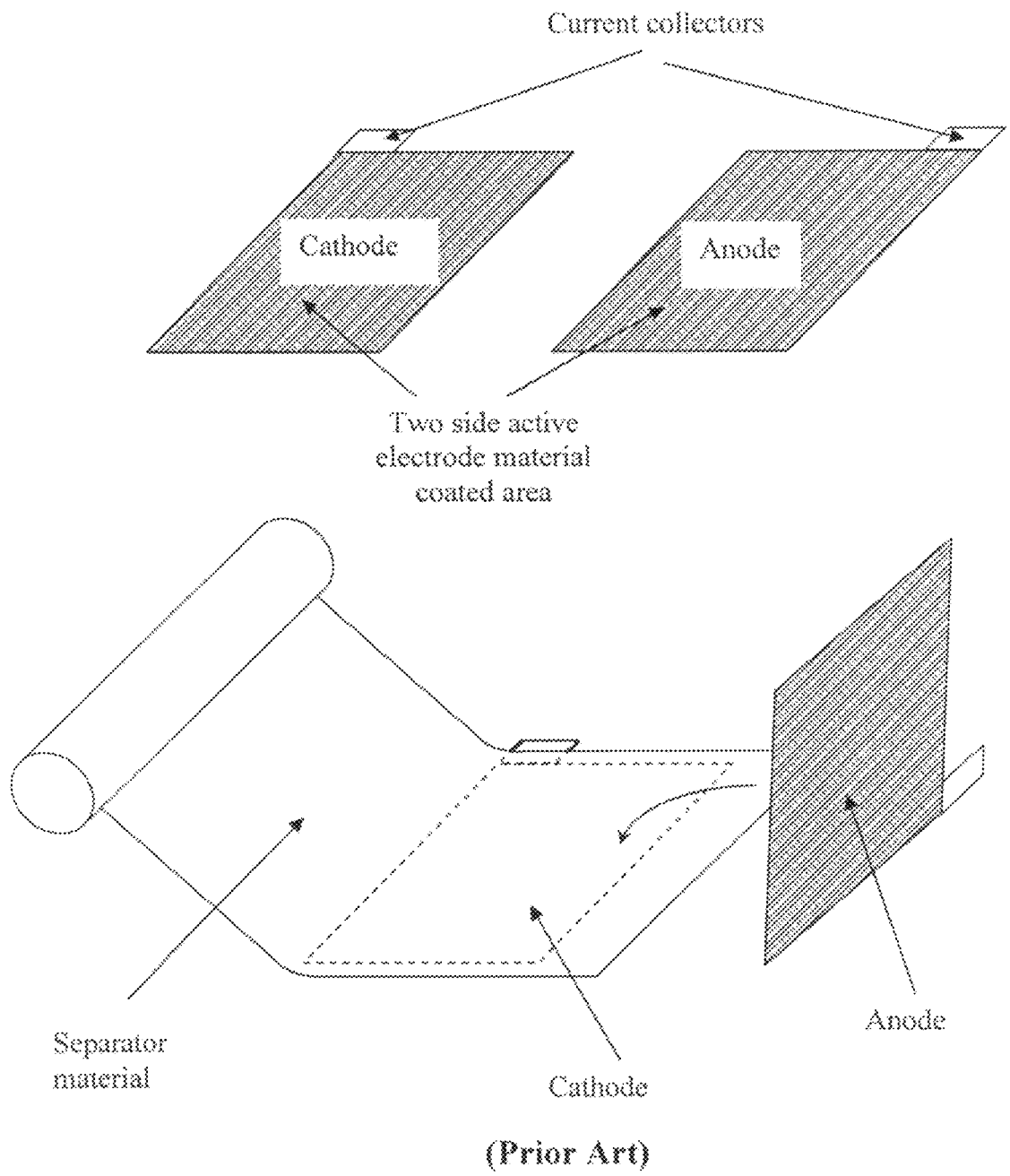
Figure 2A:
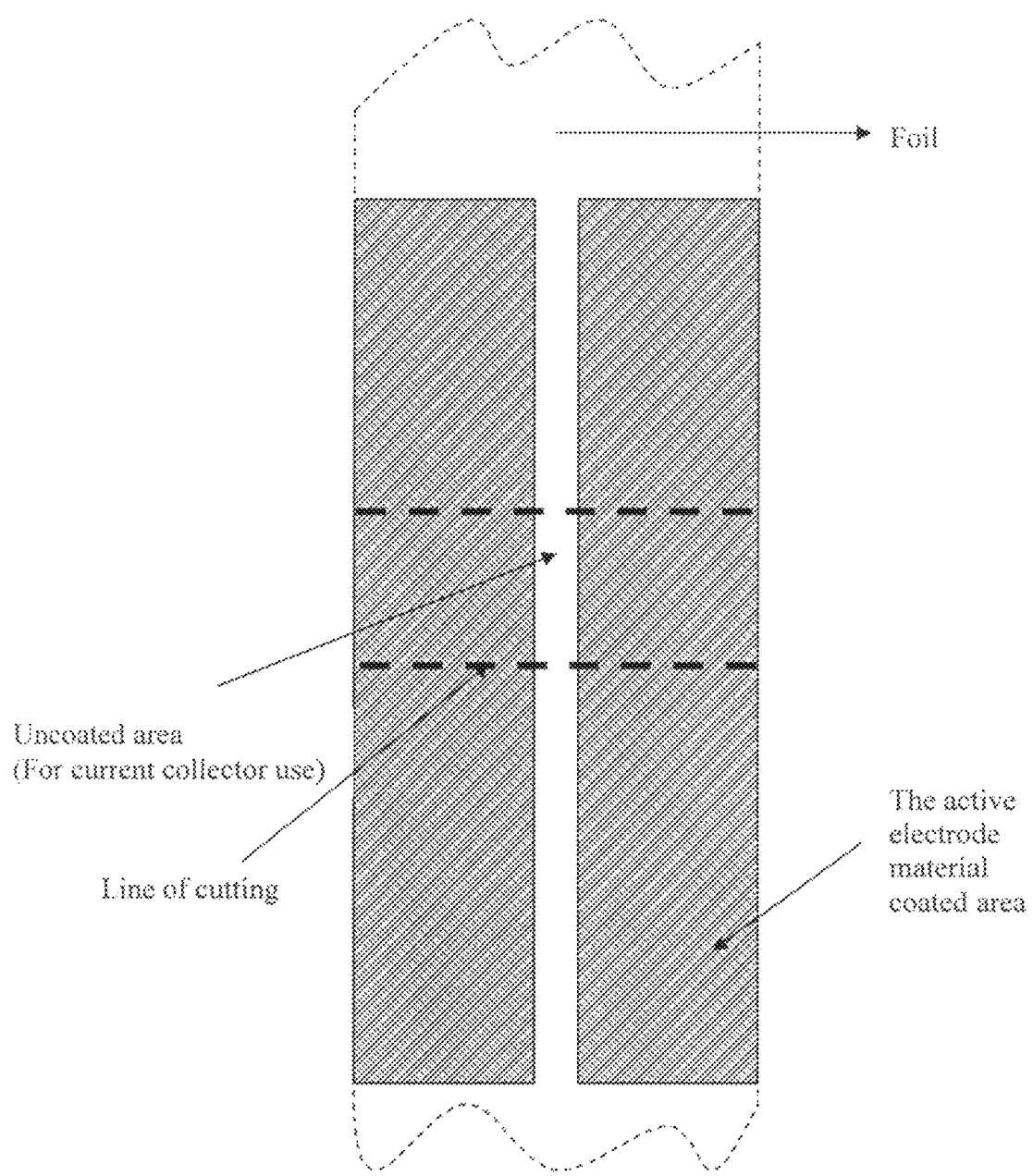
FIG. 2(a) is an elongated foil of the present invention having two portions with an active electrode material and an uncoated central portion, with lines indicated for cutting electrode pages.
Figure 2B:
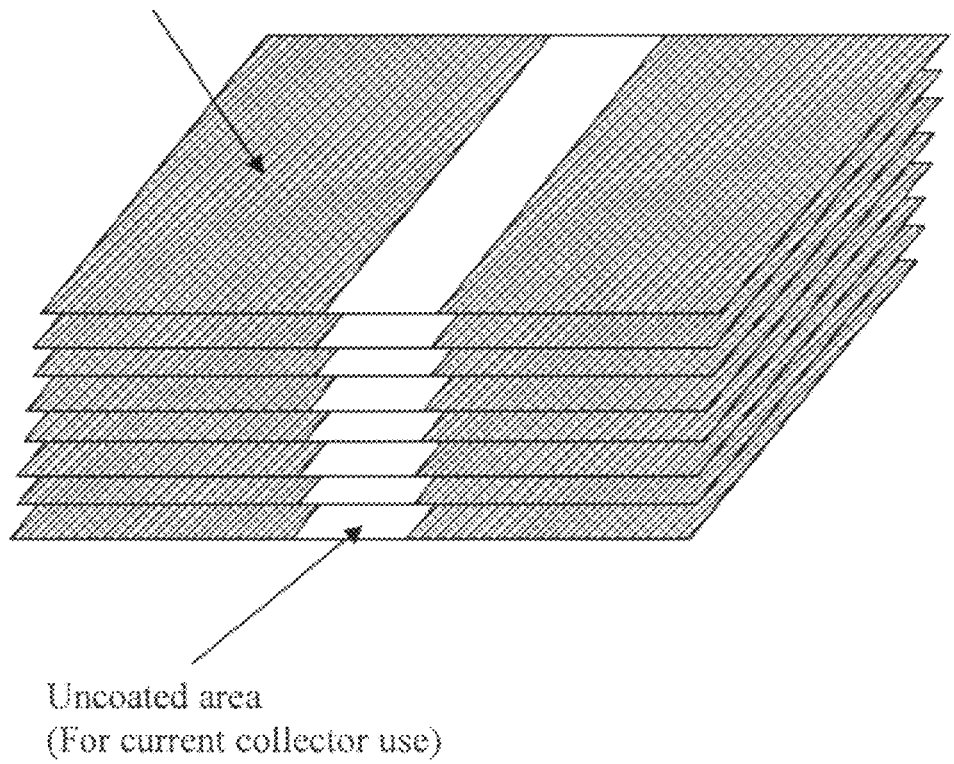
FIG. 2(b) is a stack of electrode pages of the invention with coated portions stacked in a vertical orientation.
Figure 2C:
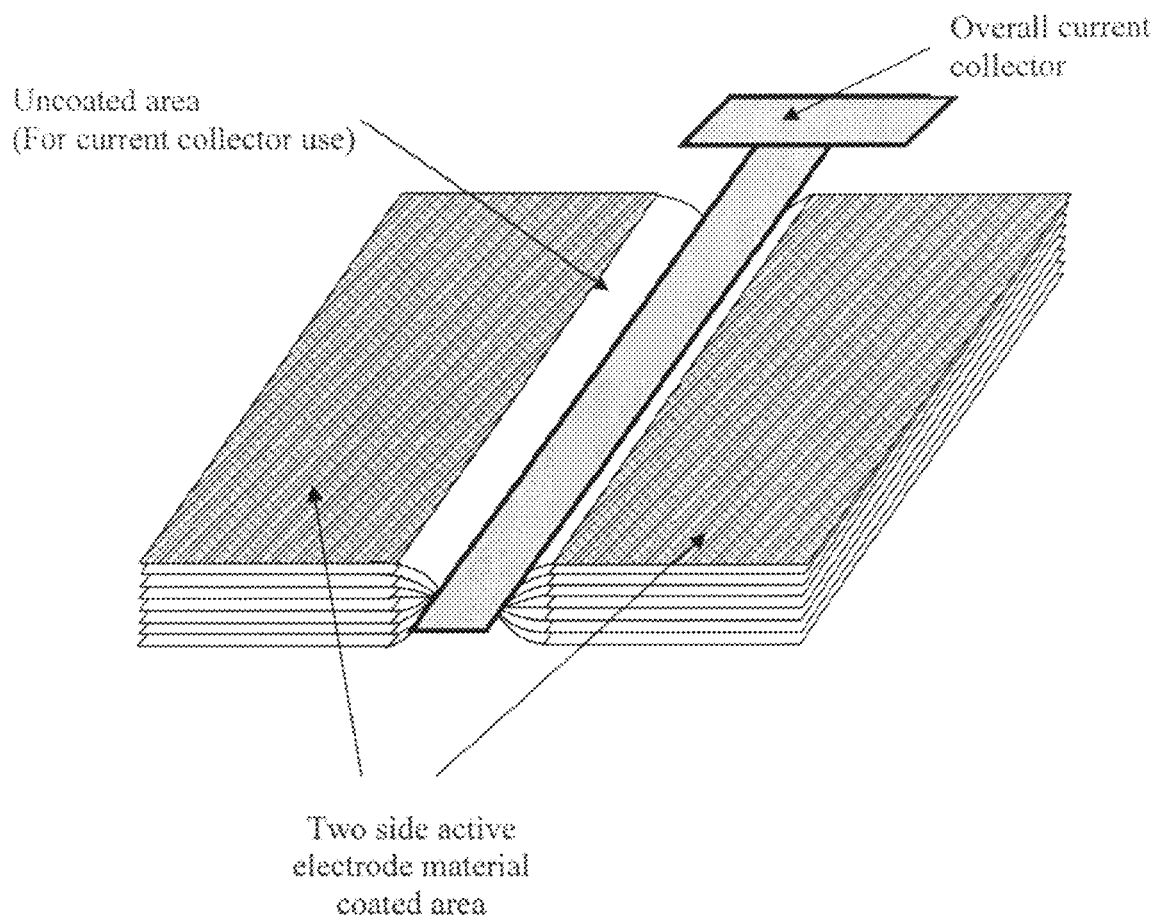
FIG. 2(c) is an electrode booklet of the invention having stacked electrode pages connected to an overall current collector.
Figure 2D:
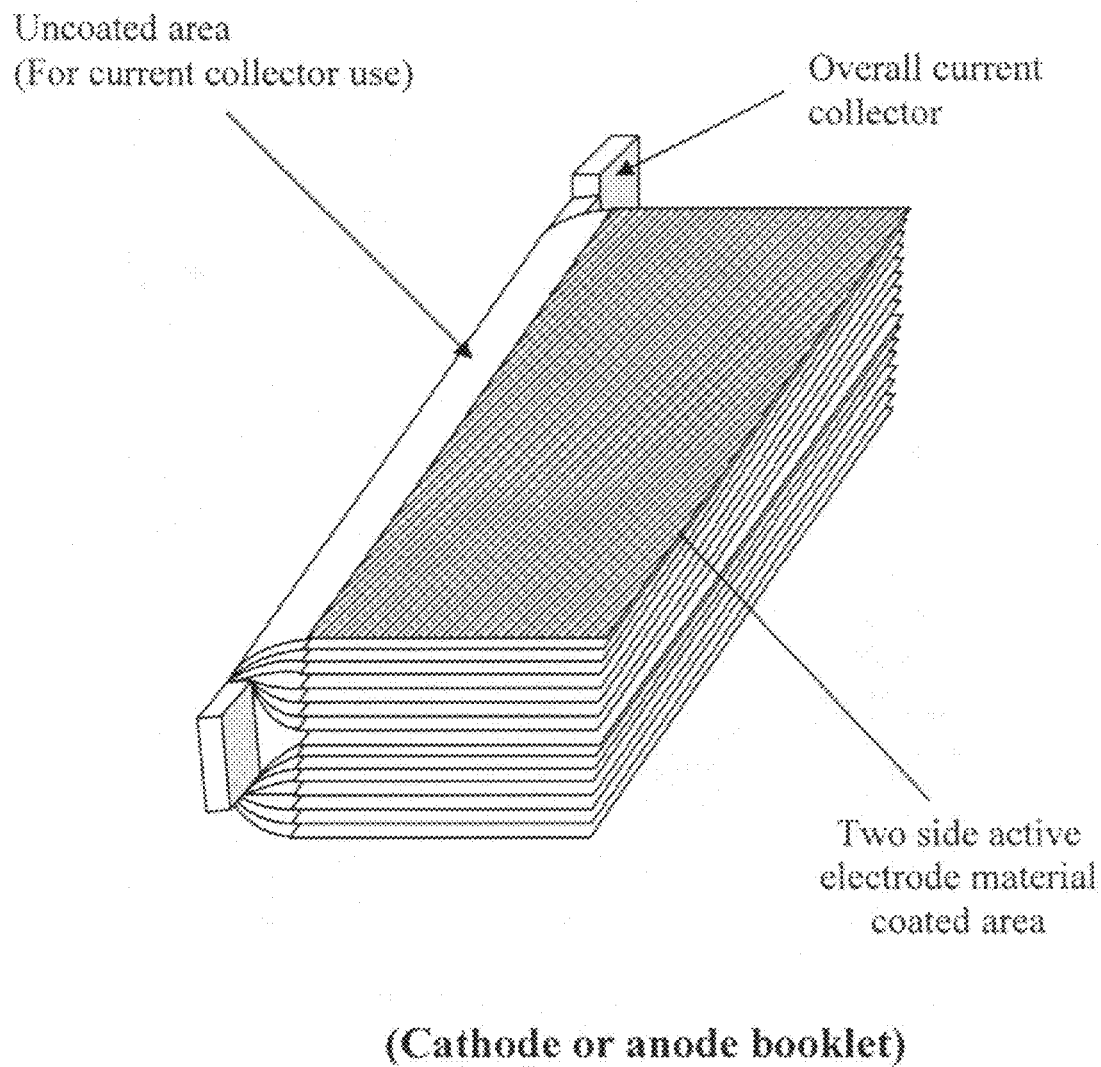
FIG. 2(d) is the electrode booklet of FIG. 2(c) arranged in a folded condition.
Figure 3A:
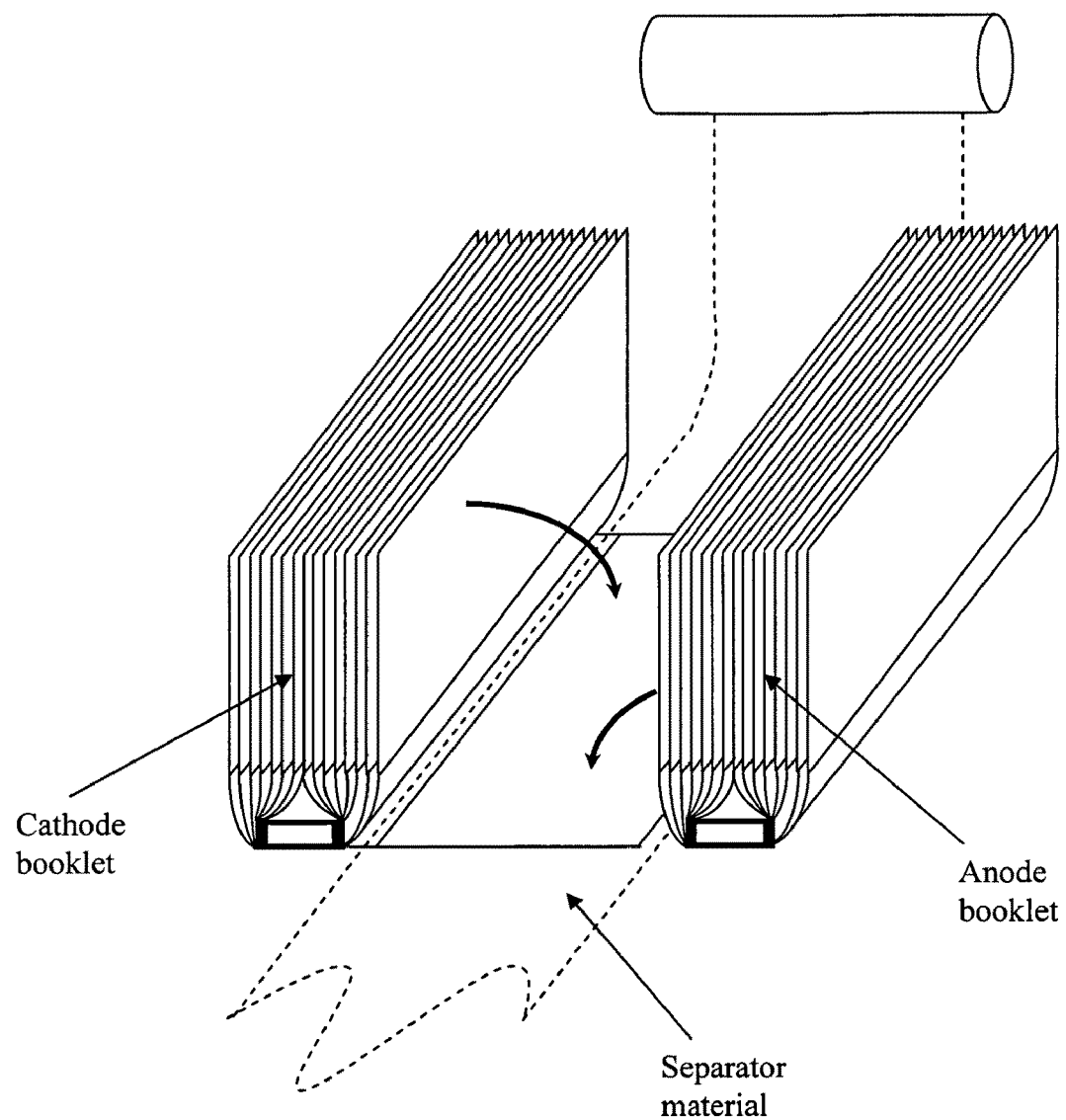
FIG. 3(a) is an anode booklet and a cathode booklet of the invention in an initial stage of fabricating a stacked electrode assembly having a separator material between coated portions of anodes and cathodes.
Figure 3B:
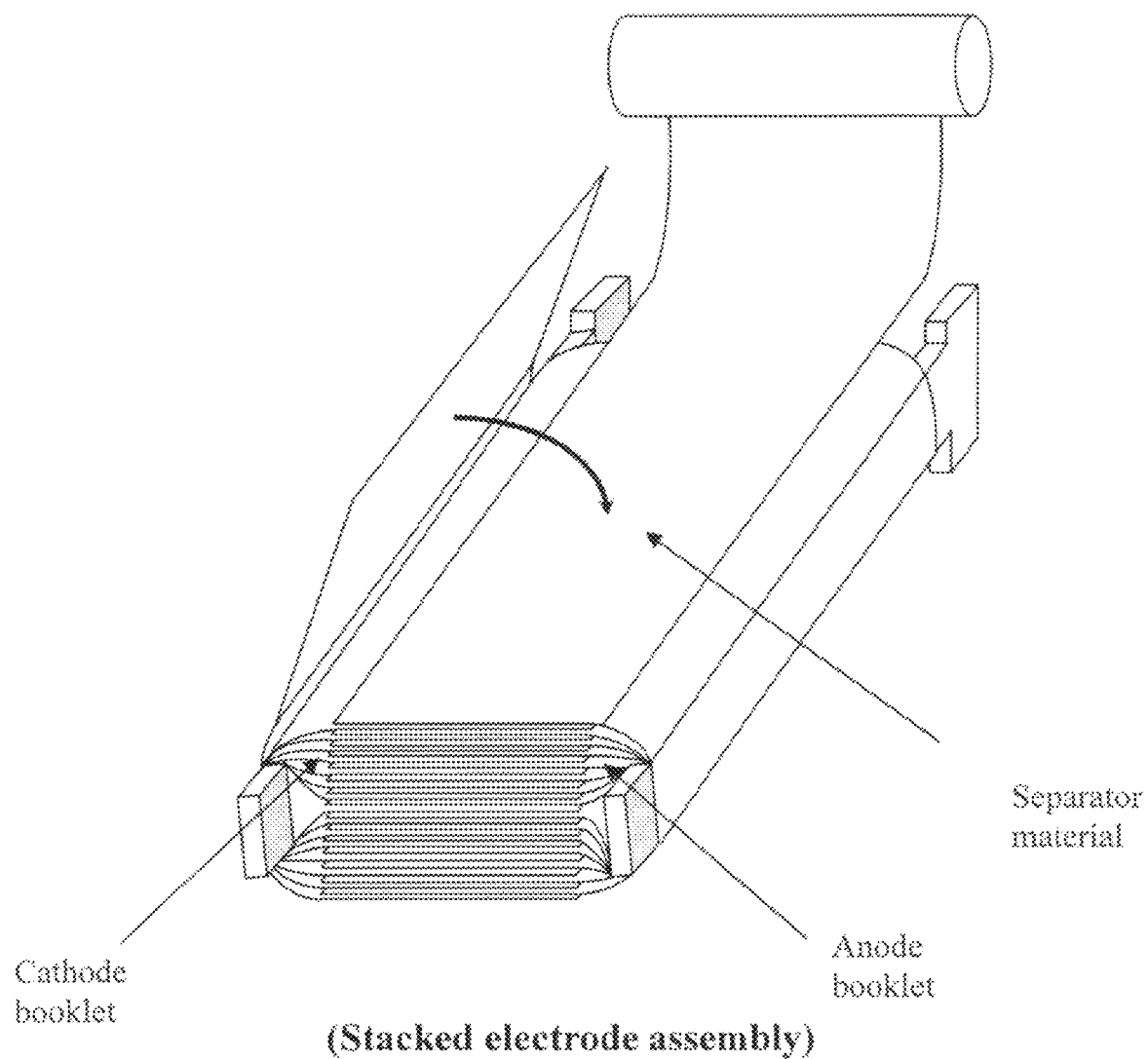
FIG. 3(b) is the stacked electrode assembly of FIG. 3(a) at a final stage of fabrication

The stacking method of the present invention can be visualized from FIGS. 2(a)-2(d) and FIGS. 3(a)-3(b). FIGS. 2(a)-2(b) show a method of preparing electrode booklets for both cathodes and anodes and FIGS. 3(a)-3(b) show a method for stacking the resulting cathode booklet together with the resulting anode booklet. FIG. 2(a) shows the electrode (same for cathode and anode) being coated with active electrode materials longitudinally the electrode is preferably an elongated foil strip having a top and bottom surface, longitudinal edges and a center line parallel to the longitudinal edges. The gap shown between the coated areas is prepared as the current collector for later use and has no active electrode material. FIG. 2(b) shows a stack of electrode pages cut transversally from the longitudinally coated electrode shown in FIG. 2(a) at the indicated cutting lines. The electrode pages are cut to provide a plurality of electrode pages of similar size and shape, with similar coated areas.

FIG. 2(c) shows an overall current collector that is welded (or connected by other methods) on the uncoated area of at least one of the electrode pages in the electrode stack shown in FIG. 2(b). The overall current collector is connected to maintain the plurality of electrode pages in the stack arrangement and to provide an electrical connection between all of the electrode pages. Finally, FIG. 2(d) shows a booklet of electrodes that can be prepared similarly for both cathodes and anodes by using either cathode active material or anode active material. In FIG. 2(d) the electrode booklet is in a folded condition.

FIG. 3(a) shows the shuffling nature of stacking electrode pages of the booklets. The separator material is implemented as a continuous strip with a longitudinal edge of the strip being parallel to the center line with respected to the cathode and anode layers. With the movement of the separator roll moving back and forth, the separator material is placed continuously in between each anode and cathode layer coming from the cathode and anode booklets. FIG. 3(b) shows the structure of the final electrode stack which will be referred to as a stacked electrode assembly. The method of electrode booklet preparation shown in FIGS. 2(a)-2(d) and the final stacked electrode assembly shown in FIG. 3(b) are ideal for thin electrode stack, usually less than about 2 cm in thickness, of the final electrode stack. Although a separator material is shown and described as being a continuous strip on a roll, it is possible in practice of the invention to have individual sheets of a separator material, or to coat surfaces of the active anode material, the active cathode material or both with a polymeric material, or the like, to separate the electrodes.

Figure 4A:
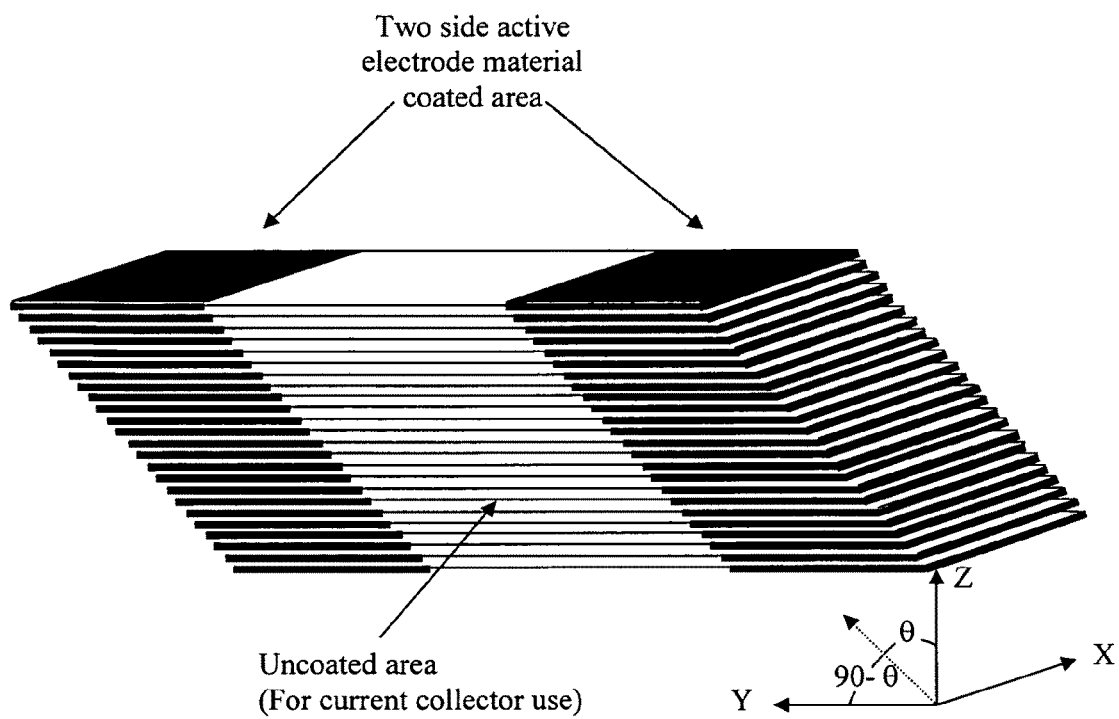
FIG. 4(a) is a stack of electrode pages of the invention with coated portions stacked with a selected angle from vertical, the selected angle being toward the left or right as shown in the drawing.
Figure 4B:
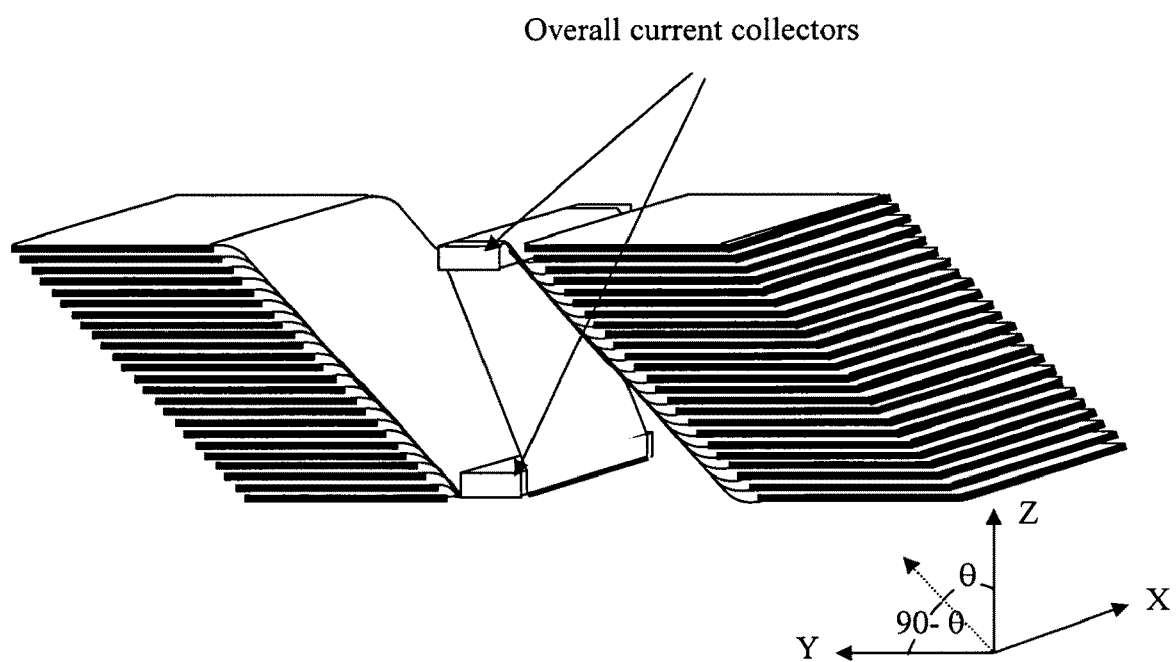
FIG. 4(b) is an electrode booklet of the invention fabricated with the stack of electrode pages of FIG. 4(a) and having two overall current collectors.
Figure 4C:
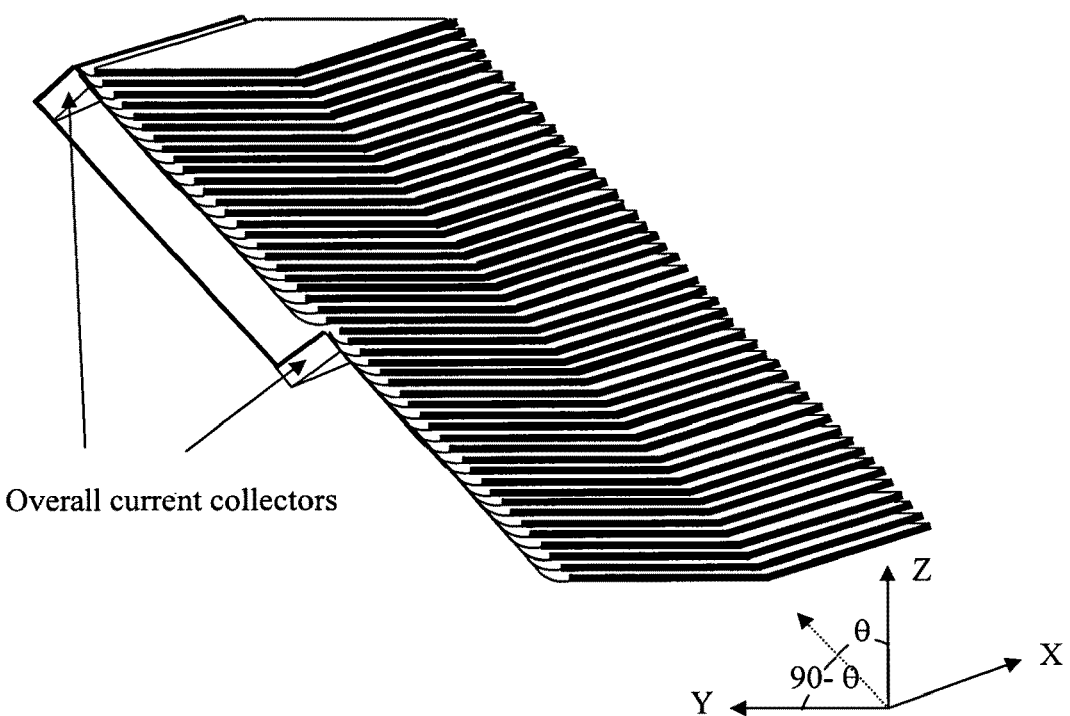
FIG. 4(c) is the electrode booklet of FIG. 4(b) arranged in a folded condition.
Figure 4D:
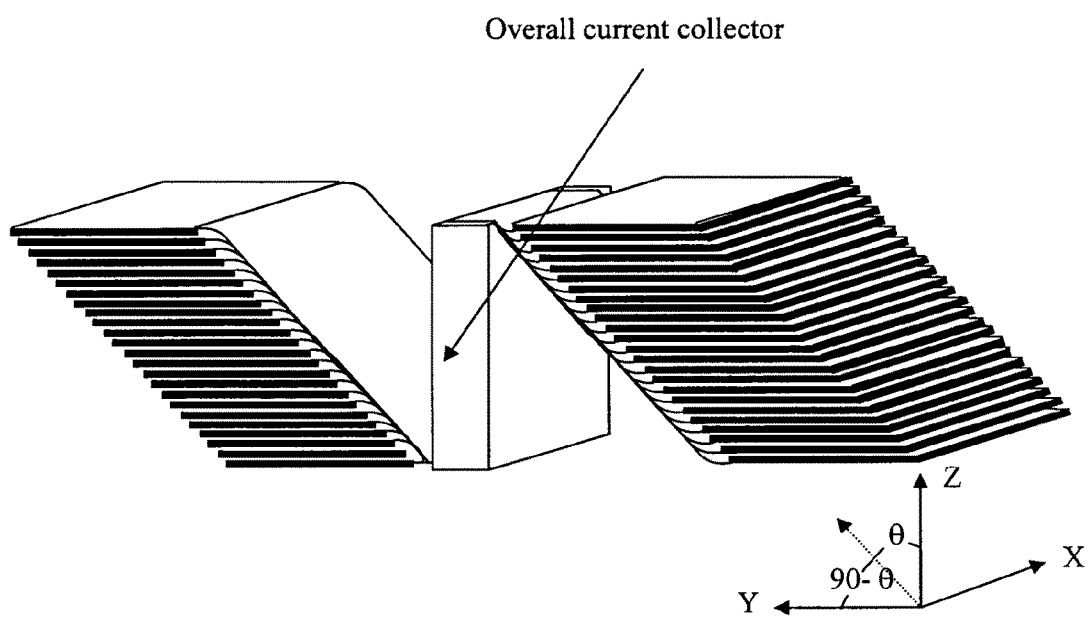
FIG. 4(d) is the electrode booklet as in FIG. 4(b) with solely one overall current collector.
Figure 4E:
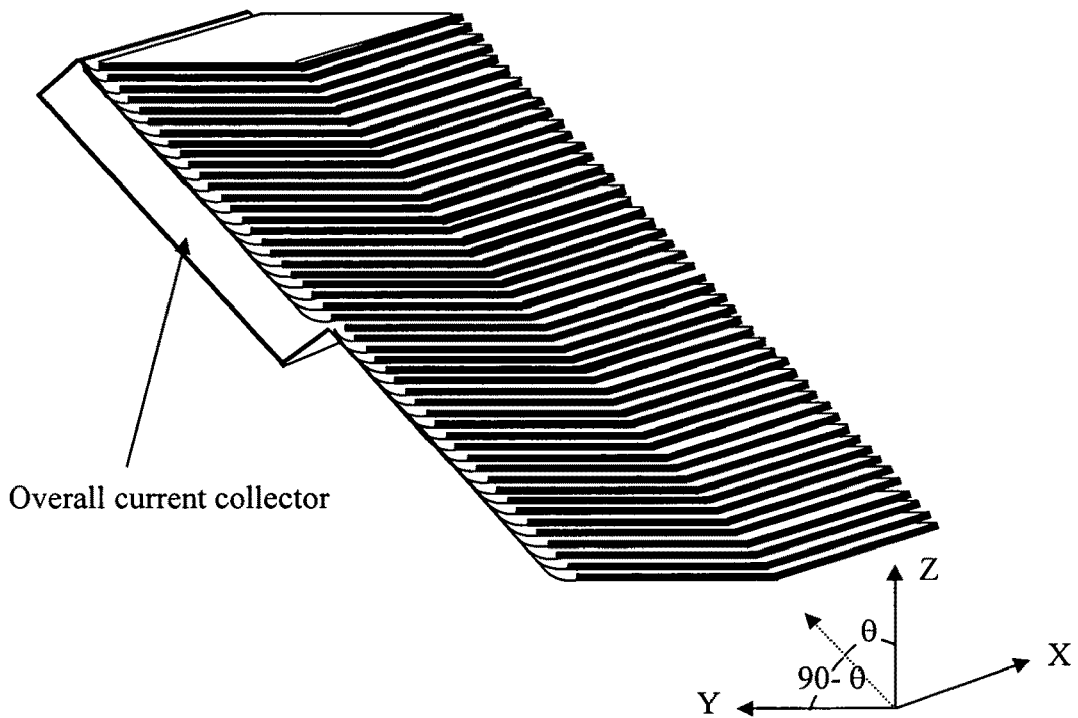
FIG. 4(e) is the electrode booklet of FIG. 4(d) arranged in a folded condition.
Figure 4F:
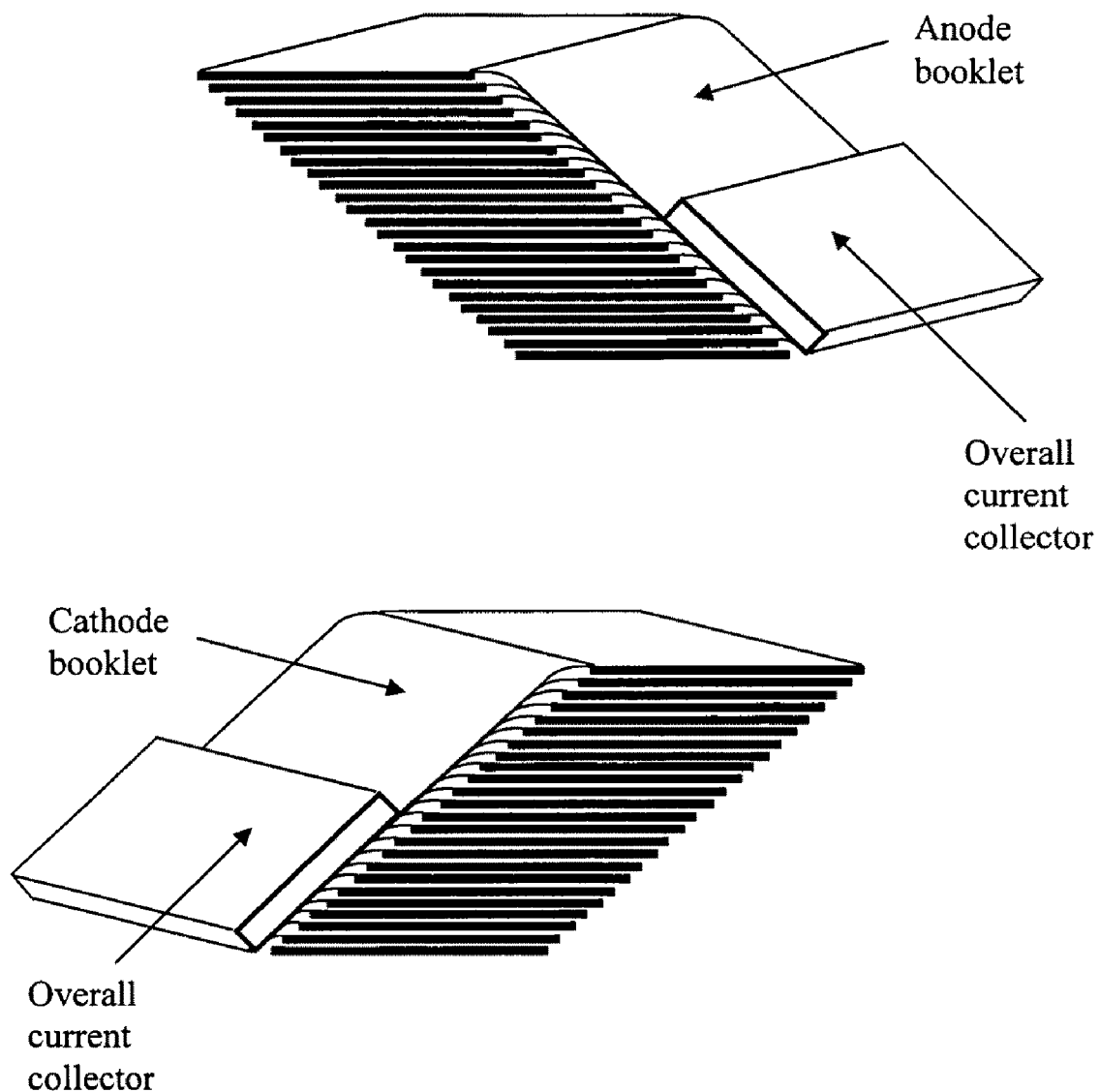
FIG. 4(f) shows two electrode booklets of the invention in a folded condition, one as an anode booklet and one as a cathode booklet.
Figure 4G:
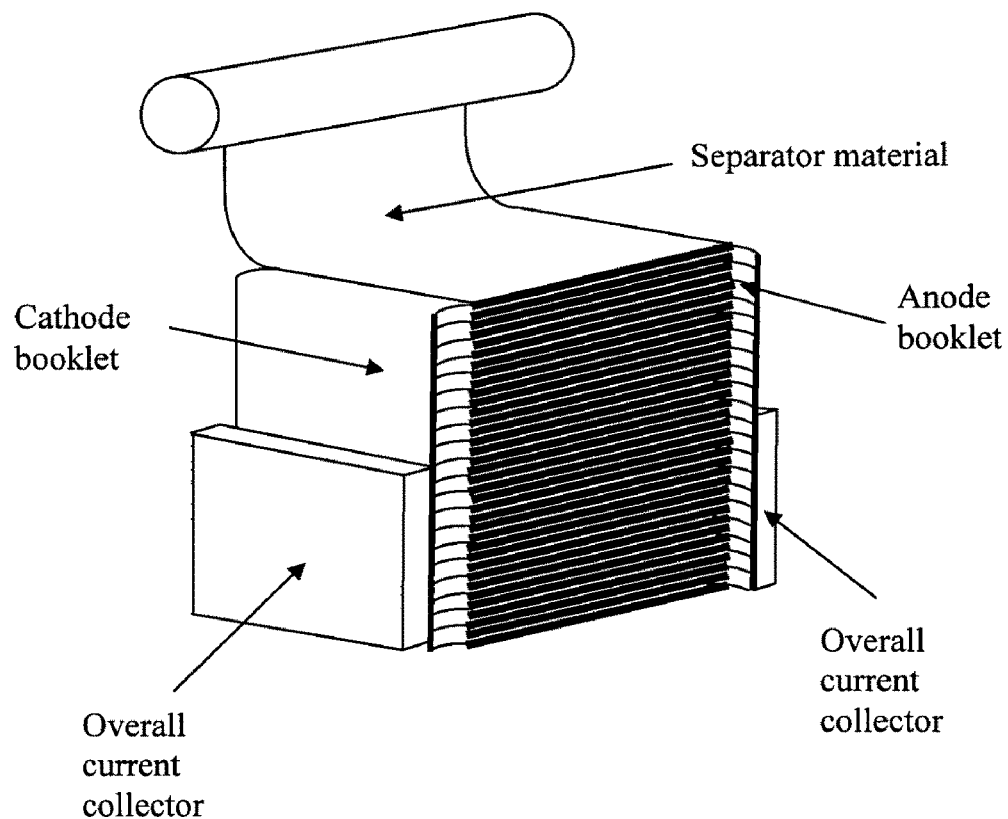
FIG. 4(g) is a stacked electrode assembly of the invention fabricated with the anode booklet and cathode booklet of FIG. 4(f) and a separator material separating each anode and cathode.

However, for a thick electrode stack (greater than about 2 cm in overall electrode stack), a front edge of an electrode booklet may not superimpose well enough to provide a vertical stacked electrode assembly owing to the numerous layers being stacked together while the layers are constrained by a certain length. The position of the front edge of each electrode in a stacked electrode assembly is important in the sense of making sure of the capacity consistency of the final cells, as well as the maximization of the cell capacity. A method of preparing electrode booklets with numerous layers and the method of forming a vertical stacked electrode assembly, with electrode edges and thus coated portions being stacked vertically above each other, are described as follows:

FIG. 4(a) shows a stack of electrode pages placed in a tilted manner, that is the coated portions are stacked at a selected angle from vertical. The tilting of the initial electrode stack is to solve the non-superposition problem for the final stacked electrode assembly. FIG. 4(b) shows two overall current collectors that are staggered and connected at positions indicated in the figure. It is necessary to have at least one overall current collector in the present embodiment. By folding the left side stack up to the top of the right side stack, a new stack (folded electrode booklet) is formed as shown in FIG. 4(c). Similarly, if the tilted stack shown in FIG. 4(a) is attached to a single overall current collector as shown in FIG. 4(d), again the folding of the left side stack to the top of the right side stack results in a new stack (folded electrode booklet) as shown in FIG. 4(e). By taking an anode booklet prepared as in the FIG. 4(e) structure and a cathode booklet prepared using the same structure, as exhibited in FIG. 4(f), the resultant stacked electrode assembly obtained after shuffling as described above becomes upright as shown in FIG. 4(g). In general, the tilting angle $\theta$ as indicated in FIGS. 4(a) and 4(b) is determined by the thickness of the cathode, the anode, and the separator material. The tilting angle may range from about 1 to 80° in order to maintain a final stacked electrode assembly with coated portions stacked vertically and with electrode edges superimposed correctly above each other. It should be mentioned again, in FIG. 4(g), the separator material is arranged longitudinally with respect to the shuffling and the separator material is kept in between each cathode and anode layer while stacking. It should be further mentioned that the processes utilized in making booklets shown in FIGS. 4(c) and 4(e) are not limited to the configuration (positions) and numbers of overall current collectors. The overall current collector positions can be implemented in the middle of the uncoated portion as shown in FIG. 2(c) or on one side of the uncoated portion as shown in FIGS. 4(c) and 4(e). Also, although in FIG. 2(c) the overall current collector is shown on top of the stack of electrode pages it can be located between any of the electrode pages or at the bottom of the stack of electrode pages.

Figure 4H:
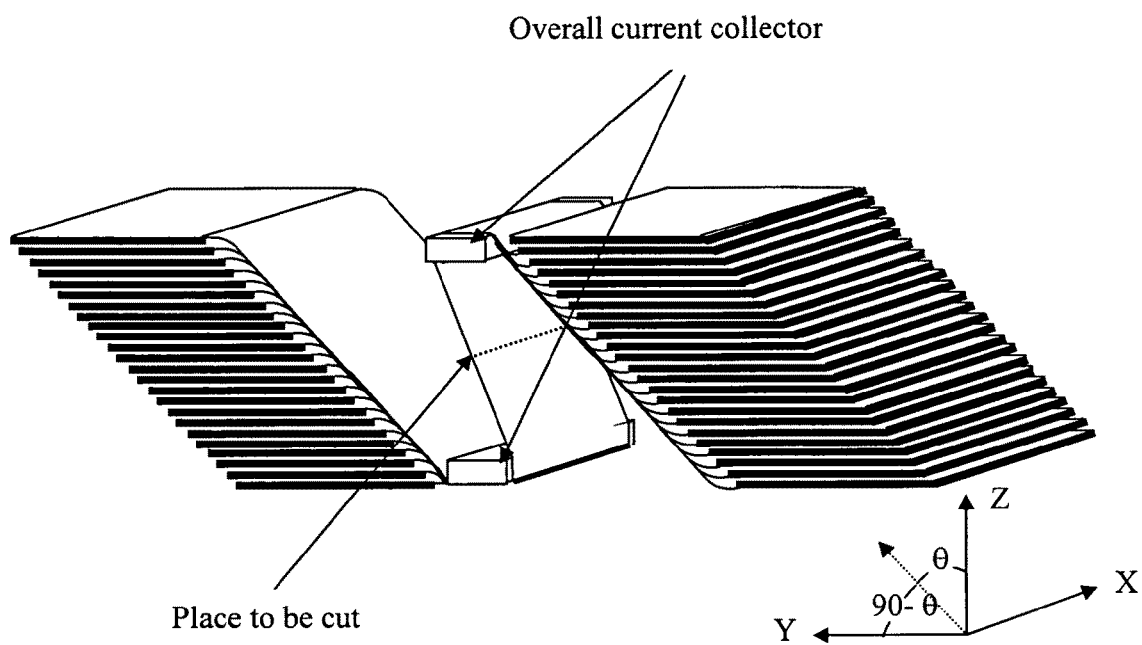
FIG. 4(h) is the electrode booklet of FIG. 4(b) showing a cutting line for use in a second embodiment of the invention.
Figure 4I:
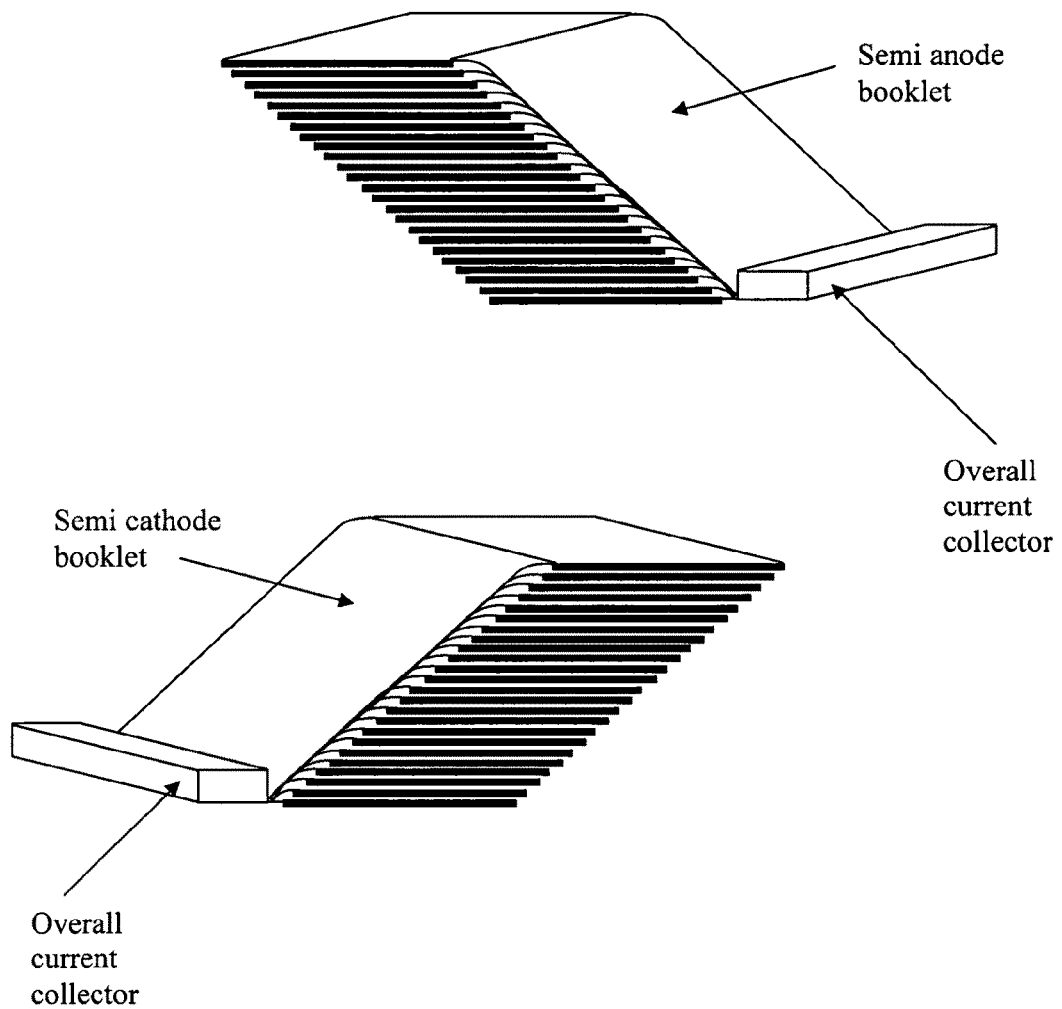
FIG. 4(i) is a semi anode booklet and a semi cathode booklet of the invention resulting from cutting an anode booklet and a cathode booklet as shown in FIG. 4(h)
Figure 4J:
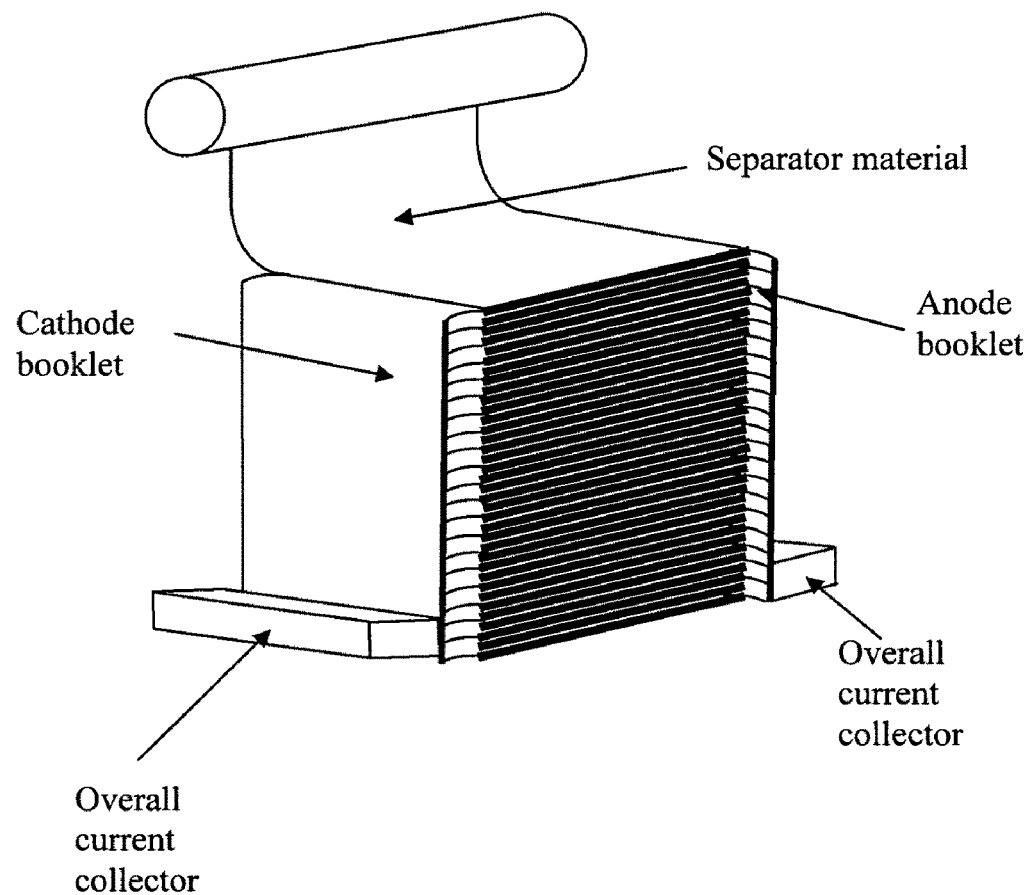
FIG. 4(j) is a cell of a battery having alternating anodes and cathodes fabricated from the semi of anode booklet and semi cathode booklet of FIG. 4(i), with a separator material separating the anodes and cathodes.

A second embodiment of the invention is disclosed for making stacked electrodes of the same symmetry obtainable by a single cutting. Taking the electrode booklet as shown in FIG. 4(b) as an example, two semi electrode booklets with exact symmetry can be obtained by cutting all of the electrode pages at a location between two overall current collectors as indicated in FIG. 4(h). After cutting, two semi electrode booklets are formed. By this method semi anode booklets and semi cathode booklets can be formed by first fabricating an anode booklet and a cathode booklet. A semi anode booklet can be shuffled with a semi cathode booklet, prepared with the same tilting arrangement and a final vertically oriented stack of electrodes can be obtained (Please refer to FIGS. 4(i) and 4(j)).

Figure 5:
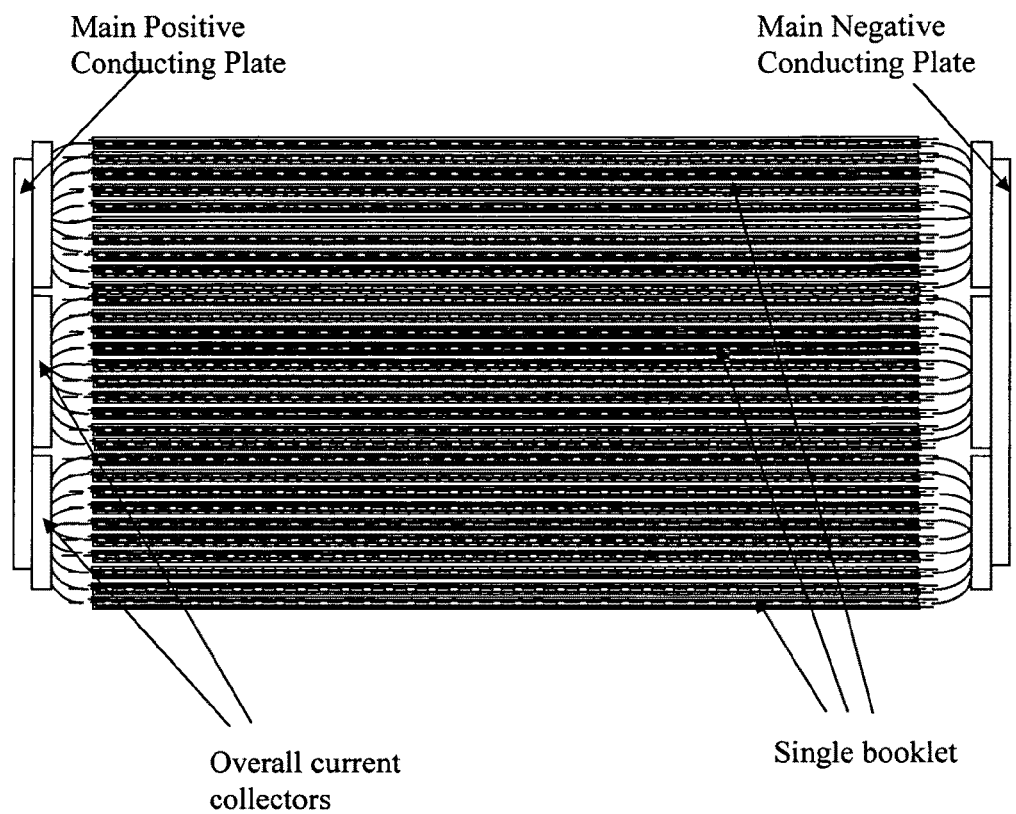
FIG. 5 is a plurality of anode booklets and cathode booklets of the invention in a stacked arrangement, with a main positive conducting plate and a main negative conducting plate connecting the overall current collectors.

In addition to the methods disclosed above for making a thick stacked electrode assembly, a thick stacked electrode assembly can be made by stacking several thin anode and cathode booklets as shown in FIG. 5 and attaching each booklet to main negative and positive conducting plates which are later connected to current collecting posts of a battery cap.

Features and advantages of the present invention include:

1. Electrode booklets are always prepared as a first step.
2. Pertinent electrode booklets can be constructed using electrode pages without further cutting or with only one cutting in forming two symmetric stacks, no matter how thick the final electrode stack is. This is very important not only to the cost reduction but also to the enhancement in quality assurance.
3. The full length of the uncoated portion of each electrode can be welded to the overall current collector and it provides uniform current distribution even with electrodes having a large surface area. This is very important for obtaining high rate capability and reducing heat generation.
4. The welding of electrode layers to the overall current collector is conducted prior to stacking anode booklets with cathode booklets. This makes the welding process more reliable with higher yield.
5. Electrode stacking can be very efficient without precision control. Short time stacking, thus cost reduction is expected.
6. High yield of an overall electrode stack results owing to the reduction of risks in undesirable stacking precision and stacking sequencing, unreliable welding, and damaging of electrodes during welding (especially the current collector part during the welding process).
7. The longitudinal direction of the separator material helps stabilizing the electrode stack thus enhances the durability of the cell, especially when vibrated in up and down directions (please refer to FIG. 6(a)).

The cell structure and assembly method disclosed above is to enhance the durability and yield of the resultant cell utilizing the electrode booklets described above. The method and the structure of cell assembly are described using the following examples:

Example I

Figure 6A:
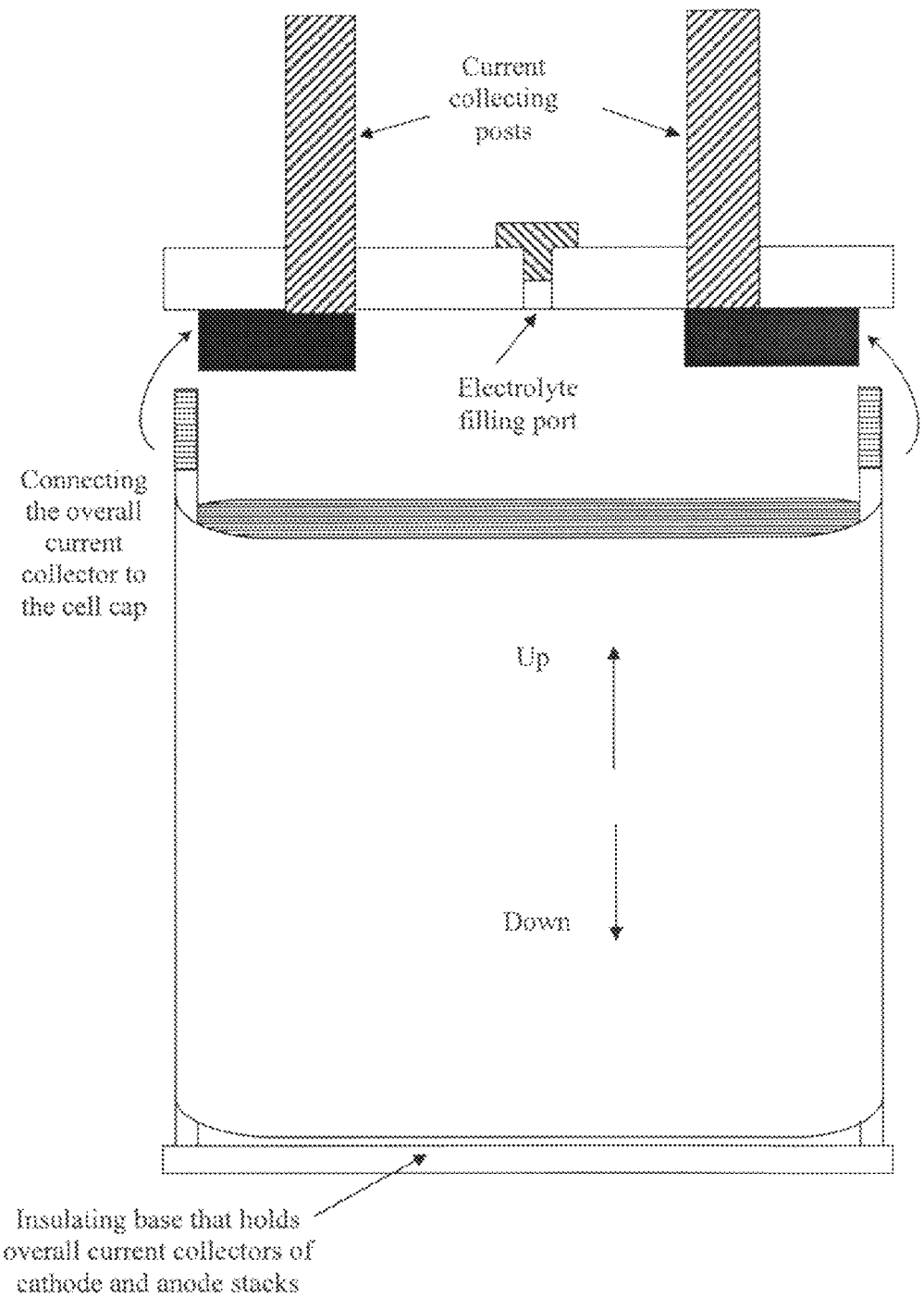
FIG. 6(a) shows electrode booklets of the invention with overall current collectors disposed in an insulating base for support.
Figure 6B:
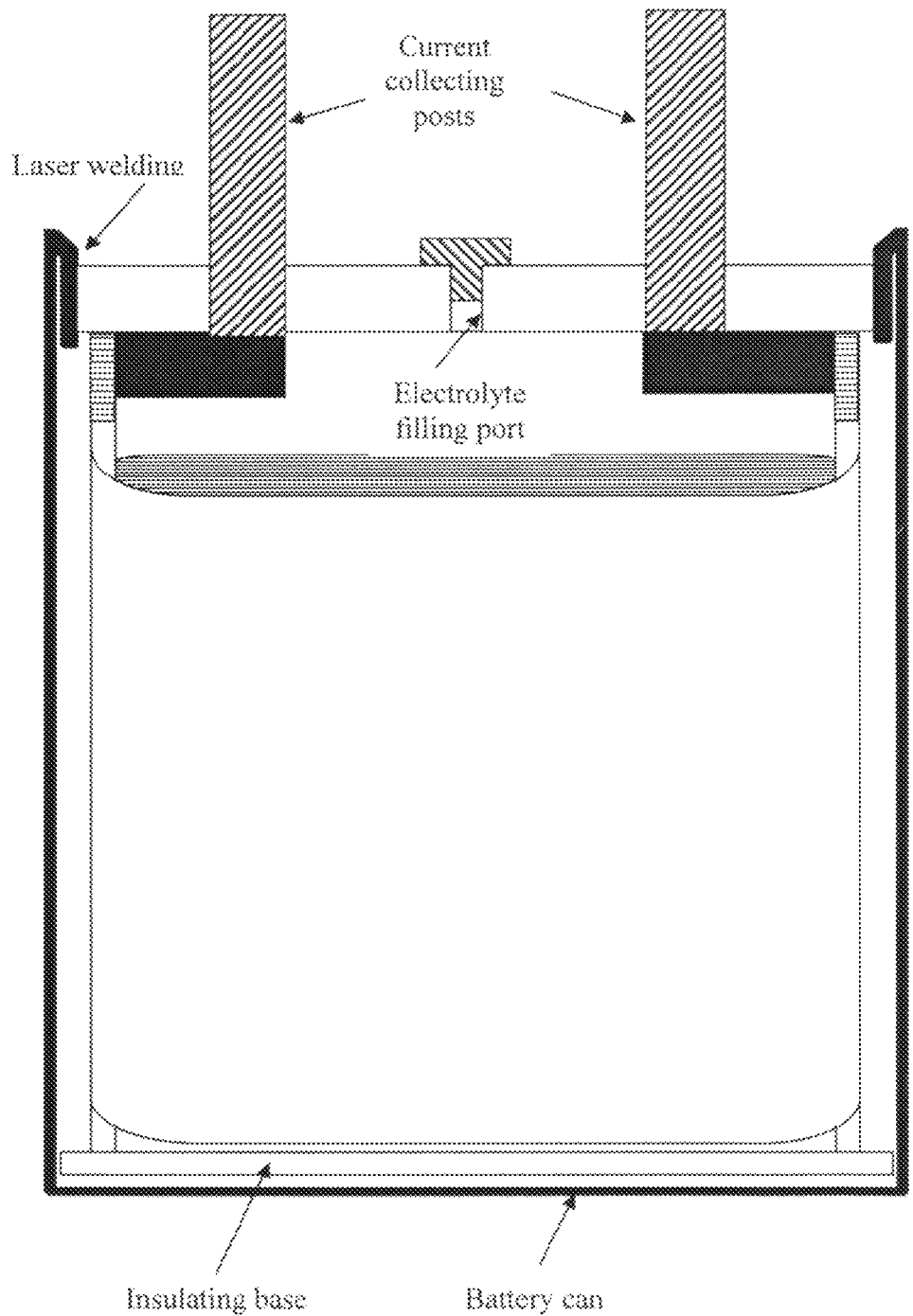
FIG. 6(b) shows an assembled rechargeable battery of the invention fabricated with use of the supported overall current collectors and electrode booklets of FIG. 6(a).

For only one anode booklet and one cathode booklet (please refer to the structure shown in FIG. 3(b)) the method of assembly for a cell is as follows:

1. Stabilizing the overall current collectors (including the cathode and anode) on an insulating base with a determined width. The insulating base is indicated in FIG. 6(a). This insulating base, which can be made of plastic, is used for both insulation of the booklets to the metal case and stabilizing the stacked electrode assembly.
2. Weld (or using bolts and nuts or other methods) the stabilized overall current collectors to the current collecting posts constructed on a battery cap (please refer to FIG. 6(a)).
3. Insert the whole structure including the battery cap and the stabilized stacked electrode assembly into the battery can (please refer to FIG. 6(b)).
4. Seal the battery can using laser welding or other equivalent methods.
5. Fill up the electrolyte to the battery through a filling port on the battery cap followed by final sealing of the filling port (please refer to FIG. 6(b)).

Example II

For a plurality of anode booklets and cathode booklets (please refer to the structure shown in FIG. 5) the method of assembly is as follows:

1. Stabilizing the overall current collectors (including the cathode and anode) of the booklets on an insulating base with a determined width. The insulating base is indicated in FIG. 6(a). This insulating base is used for both insulation of the booklet to the battery can and stabilizing the stacked electrode assembly.
2. Weld (or using bolts and nuts or other methods) the stabilized stacked electrode assembly to the main conducting plates (please refer to FIG. 5).
3. Weld (or using bolts and nuts or other methods) the main conducting plates to the current collecting posts constructed on the battery cap.
4. Insert the whole structure including the battery cap and the stabilized stacked electrode assembly in the battery can (please refer to FIG. 6(b)).
5. Seal the battery can using laser welding or other equivalent methods.
6. Fill up the electrolyte to the battery through a filling port on the battery cap followed by final sealing of the filling port (please refer to FIG. 6(b)).

In Example II, the sequence of step 1 and 2 can be switched according to the design of the processing facilities. The processes shown in Example I and II are demonstrating the ease and highly efficient nature of the present cell assembly method. The procedures are not limited to the above sequences, as well as methods, in conducting each process.

The advantages of the stabilized stacked electrode assembly made up of anode and cathode booklets and the assembling method are as follows:

1. The stabilized stacked electrode assembly structure helps in the prevention of disintegration of the stacked electrode booklets before connecting to the battery cap (e.g. during transferring process, or welding process).
2. The welding (or using bolts and nuts or other methods) of the stabilized stacked electrode assembly to the current collecting posts of the battery cap becomes easy and reliable compared to the conventional method. (Please refer to the disadvantages of conventional stacking method analyzed in the background section regarding difficulty exhibited when welding the multiple electrode tabs together and attaching them to the main negative and positive posts under the cell cap within the limited headspace).

3. The stabilized stacked electrode assembly structure helps in reducing the possibility of inaccurate welding (or using bolts and nuts or other methods) to the current collecting posts of the battery cap.

4. Owing to the advantage described in 2, the insertion of the whole structure including the battery cap and the stabilized stacked electrode assembly to the battery can becomes smooth and efficient.

5. Overall, excellent reliability and consistent cells can be constructed at high efficiency and high yield using the presently disclosed cell structure and method of processing.

While specific material, dimensions, fabricating steps, etc. have been set forth for purposes of describing embodiments of the invention, various modifications can be resorted to, in light of the above teachings, without departing from Applicants' novel contributions; therefore in determining the scope of the present invention, reference shall be made to the appended claims.

The invention claimed is:

1. A method of fabricating an electrode booklet for a rechargeable battery, comprising
providing a plurality of electrode pages, each being a foil having a shape symmetric about a center line and having a top and bottom surface coated with an active electrode material at two similar portions other than a central uncoated portion which extends between edges of the foil and includes the center line,
arranging the plurality of electrode pages in a stack with said electrode pages being similarly oriented,
providing at least one overall current collector disposed along the uncoated portion of at least one of said plurality of stacked electrode pages and connecting all the plurality of electrode pages to maintain said plurality of electrode pages in the stack arrangement and to provide an electrical connection between all of the plurality of electrode pages.

2. A method of fabricating a stacked electrode assembly of a battery, comprising
fabricating the electrode booklet of claim 1, wherein the active electrode material is an active anode material, to form an anode booklet,
fabricating the electrode booklet of claim 1, wherein the active electrode material is an active cathode material, to form a cathode booklet, wherein said anode booklet and said cathode booklet are substantially similar in size, shape and number of pages, and said at least one overall current collectors are connected in a manner to form a vertical stack of coated portions,
folding said anode booklet and said cathode booklet about their respective uncoated portions,
arranging the folded booklets to result in coated portions of the booklets being in a vertical stack with coated portions of the anode booklet alternated with coated portions of the cathode booklet, with the at least one overall current collector of the anode booklet being disposed on one side of the resulting vertical stack and the at least one overall current collector of the cathode booklet being disposed on the opposite side of the resulting vertical stack, and
inserting a separator material, while arranging the folded booklets, to separate each coated portion.

3. A method of fabricating a stacked electrode assembly of a battery, comprising
fabricating the electrode booklet of claim 1, wherein the active electrode material is an active anode material, to form an anode booklet,
fabricating the electrode booklet of claim 1, wherein the active electrode material is an active cathode material, to form a cathode booklet, wherein said anode booklet and said cathode booklet are substantially similar in size, shape and number of pages, and said at least one overall current collectors are connected in a manner to form a stack of coated portions being stacked at a selected angle from vertical,
folding said anode booklet and said cathode booklet about their respective uncoated portions,
arranging the folded booklets to result in coated portions of the booklets being in a vertical stack with coated portions of the anode booklet alternated with coated portions of the cathode booklet, with the at least one overall current collector of the anode booklet being disposed on one side of the resulting vertical stack and the at least one overall current collector of the cathode booklet being disposed on the opposite side of the resulting vertical stack, and
inserting a separator material, while arranging the folded booklets, to separate each coated portion.

4. A method of fabricating a semi electrode booklet of a battery, comprising
fabricating the electrode booklet of claim 1, wherein the active electrode material is an active anode material, to form an anode booklet,
fabricating the electrode booklet of claim 1, wherein the active electrode material is an active cathode material, to form a cathode booklet,
said anode booklet and said cathode booklet being substantially similar in size, shape and number of pages, and each booklet having at least two overall current collectors being connected to the uncoated portions of all of the plurality of said electrode pages in a manner to result in a stack of coated portions being stacked at a selected angle from vertical and providing an electrical connection between all of the plurality of said electrode pages,
forming semi electrode booklets by cutting said plurality of electrode pages of the booklets at a location between two overall current collectors to result in two semi anode booklets with each having at least one overall current collector with coated portions being stacked at a selected angle from vertical and to result in two semi cathode booklets with each having at least one overall current collector with coated portions being stacked at the selected angle from vertical.

5. A method of fabricating a stacked electrode assembly of a battery, comprising:
arranging one semi anode booklet and one semi cathode booklet of claim 4 to provide coated portions of one semi anode booklet alternated with coated portions of one semi cathode booklet in a vertical stack, with the at least one overall current collector of the one semi anode booklet being disposed on one side of the vertical stack and the at least one overall current collector of the one semi cathode booklet being disposed on the opposite side of the vertical stack, and inserting a separator material, while arranging the semi anode booklet and the semi cathode booklet, to separate each coated portion.

6. A method of fabricating a supported stacked electrode assembly, comprising:
providing an insulating base for supporting overall current collectors, and
disposing overall current collectors of the booklets of claim 2, 3, or 5 in said insulating base.

7. A method of fabricating a rechargeable battery, comprising:
   providing a battery cap having current collector posts,
   electrically connecting the overall current collectors to the current collecting posts,
   providing a battery can,
   inserting the supported electrode assembly of claim 6 in the battery can, wherein the insulating base is adjacent the bottom of the can,
   welding the battery cap to the battery can to seal the battery, and
   providing an electrolyte to fill the battery can.

8. A method of fabricating a rechargeable battery, comprising:
   a) providing an elongated foil strip having a top and a bottom surface longitudinal edges and a center line parallel to the longitudinal edges;
   b) selectively coating portions of the top and bottom surfaces adjacent the longitudinal edges with an active electrode material to provide active electrode material at symmetric portions other than a central uncoated portion which includes the center line;
   c) cutting the foil strip, at equally spaced locations along the strip, in a direction perpendicular to the longitudinal edges of the strip, to provide a plurality of electrode pages each having the coated portions and the uncoated portion between the coated portions;
   d) arranging the plurality of electrode pages in a vertical stack with said electrode pages being similarly oriented;
   e) forming an electrode booklet by providing at least one overall current collector disposed along the uncoated portion of at least one of said plurality of stacked electrode pages to maintain said plurality of electrode pages in the stack arrangement and to provide an electrical connection between all of the plurality of electrode pages;
   f) repeating steps (a) to (e) to form a second electrode booklet, wherein in step (b) an active anode material is used for the active electrode material for the first electrode booklet to form an anode booklet, and in step (b) an active cathode material is used for the active electrode material for the second electrode booklet to form a cathode booklet, and said anode booklet and said cathode booklet are substantially similar in size, shape and number of pages;
   g) folding said anode booklet and said cathode booklet about their respective uncoated portions;
   h) forming a stacked electrode assembly by arranging the folded booklets to provide coated portions of the anode booklet alternated with coated portions of the cathode booklet and inserting a separator material between each coated portion to result in a vertical stack having at least one overall current collector of the anode booklet being disposed on one side of the resulting vertical stack and at least one overall current collector of the cathode booklet being disposed on the opposite side of the resulting vertical stack;
   i) providing an insulating base for supporting overall current collectors and disposing overall current collectors of the stacked electrode assembly in the insulating base;
   j) providing a battery cap having current collecting posts;
   k) electrically connecting the overall current collectors to the current collecting posts;
   l) providing a battery can
   m) inserting the supported stacked electrode assembly in the battery can wherein the insulating base is adjacent the bottom of the can;
   n) welding the battery cap to the battery can to seal the battery, and
   o) providing an electrolyte to fill the battery can.

9. A method of fabricating a rechargeable battery, comprising:
   a) providing an elongated foil strip having a top and a bottom surface longitudinal edges and a center line parallel to the longitudinal edges;
   b) selectively coating portions of the top and bottom surfaces adjacent the longitudinal edges with an active electrode material to provide active electrode material at symmetric portions other than a central uncoated portion which includes the center line;
   c) cutting the foil strip, at equally spaced locations along the strip, in a direction perpendicular to the longitudinal edges of the strip, to provide a plurality of electrode pages each having the coated portions and the uncoated portion between the coated portions;
   d) arranging the plurality of electrode pages in a stack with said electrode pages being similarly oriented and with the coated portions being stacked at a selected angle from vertical;
   e) forming an electrode booklet by providing at least one overall current collector disposed along the uncoated portion of at least one of said plurality of stacked electrode pages to maintain said plurality of electrode pages in the stack arrangement and to provide an electrical connection between all of the plurality of electrode pages;
   f) repeating steps (a) to (e) to form a second electrode booklet, wherein in step (b) an active anode material is used for the active electrode material for the first electrode booklet to form an anode booklet, and in step (b) an active cathode material is used for the active electrode material for the second electrode booklet to form a cathode booklet, and said anode booklet and said cathode booklet are substantially similar in size, shape and number of pages;
   g) folding said anode booklet and said cathode booklet about their respective uncoated portions;
   h) forming a stacked electrode assembly by arranging the folded booklets to provide coated portions of the anode booklet alternated with coated portions of the cathode booklet and inserting a separator material between each coated portion to result in a vertical stack having at least one overall current collector of the anode booklet being disposed on one side of the resulting vertical stack and at least one overall current collector of the cathode booklet being disposed on the opposite side of the resulting vertical stack;
   i) providing an insulating base for supporting overall current collectors and disposing overall current collectors of the stacked electrode assembly in the insulating base;
   j) providing a battery cap having current collecting posts;
   k) electrically connecting the overall current collectors to the current collecting posts;
   l) providing a battery can
   m) inserting the supported stacked electrode assembly in the battery can wherein the insulating base is adjacent the bottom of the can;
   n) welding the battery cap to the battery can to seal the battery, and
   o) providing an electrolyte to fill the battery can.

10. A method of fabricating a rechargeable battery, comprising:
   a) providing an elongated foil strip having a top and a bottom surface longitudinal edges and a center line parallel to the longitudinal edges;
   b) selectively coating portions of the top and bottom surfaces adjacent the longitudinal edges with an active electrode material to provide active electrode material at symmetric portions other than a central uncoated portion which includes the center line;
   c) cutting the foil strip, at equally spaced locations along the strip, in a direction perpendicular to the longitudinal edges of the strip, to provide a plurality of electrode pages each having the coated portions and the uncoated portion between the coated portions;
   d) arranging the plurality of electrode pages in a stack with said electrode pages being similarly oriented and with the coated portions being stacked at a selected angle from vertical;
   e) forming an electrode booklet by providing at least two overall current collectors disposed along the uncoated portion of at least one of said plurality of stacked electrode pages to maintain said plurality of electrode pages in the stack arrangement and to provide an electrical connection between all of the plurality of electrode pages;
   f) repeating steps (a) to (e) to form a second electrode booklet, wherein in step (b) an active anode material is used for the active electrode material for the first electrode booklet to form an anode booklet, and in step (b) an active cathode material is used for the active electrode material for the second electrode booklet to form a cathode booklet, and said anode booklet and said cathode booklet are substantially similar in size, shape and number of pages;
   g) forming semi electrode booklets by cutting said plurality of electrode pages of the booklets at a location between the two overall current collectors to result in two semi anode booklets with each having at least one overall current collector with coated portions being stacked at a selected angle from vertical and to result in two semi cathode booklets with each having at least one overall current collector with coated portions being stacked at the selected angle from vertical
   h) forming a stacked electrode assembly by arranging one semi anode booklet and one semi cathode booklet to provide coated portions of the semi anode booklet alternated with coated portions of the semi cathode booklet and inserting a separator material between each coated portion to result in a vertical stack having at least one overall current collector of the semi anode booklet being disposed on one side of the resulting vertical stack and at least one overall current collector of the semi cathode booklet being disposed on the opposite side of the resulting vertical stack;
   i) providing an insulating base for supporting overall current collectors and disposing overall current collectors of the stacked electrode assembly in the insulating base;
   j) providing a battery cap having current collecting posts;
   k) electrically connecting the overall current collectors to the current collecting posts;
   l) providing a battery can
   m) inserting the supported stacked electrode assembly in the battery can wherein the insulating base is adjacent the bottom of the can;
   n) welding the battery cap to the battery can to seal the battery, and
   o) providing an electrolyte to fill the battery can.

* * * * *